United States Patent
Pinto et al.

(10) Patent No.: US 12,236,086 B2
(45) Date of Patent: Feb. 25, 2025

(54) LOCAL MANAGEMENT CONSOLE FOR STORAGE DEVICES

(71) Applicant: Samsung Electronics Co., Ltd., Suwon-si (KR)

(72) Inventors: Oscar Prem Pinto, San Jose, CA (US); Ramdas Kachare, Pleasanton, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/167,971

(22) Filed: Feb. 4, 2021

(65) Prior Publication Data

US 2021/0157483 A1 May 27, 2021

Related U.S. Application Data

(63) Continuation of application No. 15/894,718, filed on Feb. 12, 2018, now abandoned.
(Continued)

(51) Int. Cl.
*H04L 67/1097* (2022.01)
*G06F 3/06* (2006.01)
(Continued)

(52) U.S. Cl.
CPC .......... *G06F 3/0605* (2013.01); *G06F 3/0679* (2013.01); *G06F 11/3034* (2013.01);
(Continued)

(58) Field of Classification Search
CPC .. G06F 3/0605; G06F 3/0679; G06F 11/3034; H04L 67/1097
See application file for complete search history.

(56) References Cited

U.S. PATENT DOCUMENTS 6,301,615 B1 * 10/2001 Kutcher .............. G06F 11/3495
707/999.01
6,349,335 B1 2/2002 Jenney
(Continued)

FOREIGN PATENT DOCUMENTS

CN 105893323 A 8/2016
CN 106970866 A 7/2017
(Continued)

OTHER PUBLICATIONS

"NVM Express over Fabrics," Revision 1.0, Jun. 5, 2016 (Year: 2016).*
(Continued)

*Primary Examiner* — Andrew C Georgandellis
(74) *Attorney, Agent, or Firm* — Lewis Roca Rothgerber Christie LLP (57) ABSTRACT

A local management console includes: a communication interface to connect to a baseboard management controller (BMC) of a chassis in a data storage rack; and a display that displays information associated with one or more data storage devices included in the chassis. The information includes at least one of configuration, control, debugging, or status data associated with at least one of the one or more storage devices. The local management console connects to the BMC through the communication interface, and responsive to receiving a first interaction associated with the display, performs at least one of a configuration, control, debugging, or status acquisition operation on at least one of the one or more data storage devices.

21 Claims, 6 Drawing Sheets

Related U.S. Application Data (60) Provisional application No. 62/608,383, filed on Dec. 20, 2017.

(51) Int. Cl.
*G06F 11/30* (2006.01)
*H04L 43/00* (2022.01)
*H04L 49/351* (2022.01)

(52) U.S. Cl.
CPC ............ *H04L 43/00* (2013.01); *H04L 49/351* (2013.01); *H04L 67/1097* (2013.01)

(56) References Cited

U.S. PATENT DOCUMENTS

| | | | |
|---|---|---|---|
| 9,294,567 | B2 | 3/2016 | Hussain et al. |
| 9,323,659 | B2 | 4/2016 | Shats et al. |
| 9,665,521 | B2 | 5/2017 | Hormuth et al. |
| 9,721,660 | B2 | 8/2017 | Kelly et al. |
| 9,910,618 | B1 | 3/2018 | Curley et al. |
| 10,841,275 | B2 * | 11/2020 | Worley .................... H04L 69/22 |
| 2006/0031636 | A1 * | 2/2006 | Mizuno ................. G06F 3/0622 711/148 |
| 2007/0101432 | A1 * | 5/2007 | Carpenter ............. G06F 21/552 726/25 |
| 2008/0028045 | A1 | 1/2008 | Bealkowski |
| 2013/0138808 | A1 * | 5/2013 | Biller .................. G06F 11/3006 709/224 |
| 2014/0006603 | A1 | 1/2014 | Yang |
| 2014/0075327 | A1 * | 3/2014 | Noel .................... G06F 11/0721 715/744 |
| 2014/0213177 | A1 * | 7/2014 | Terwilliger .............. H04B 5/72 455/41.1 |
| 2014/0280469 | A1 * | 9/2014 | Messer .................. G06F 11/30 709/203 |
| 2015/0089221 | A1 * | 3/2015 | Taylor ................... H04L 9/3236 713/168 |
| 2015/0149631 | A1 * | 5/2015 | Lissack ............... H04L 41/5051 709/226 |
| 2016/0085718 | A1 | 3/2016 | Huang |
| 2016/0127492 | A1 * | 5/2016 | Malwankar ......... H04L 67/1097 709/212 |
| 2016/0132237 | A1 | 5/2016 | Jeong et al. |
| 2017/0031632 | A1 | 2/2017 | Yun et al. |
| 2017/0300431 | A1 * | 10/2017 | Su .......................... H04L 41/00 |
| 2018/0205603 | A1 * | 7/2018 | Condict .............. H04L 41/0681 |
| 2018/0288152 | A1 * | 10/2018 | Chagam Reddy .... G06F 3/0635 |
| 2019/0042520 | A1 * | 2/2019 | Velez .................... G06F 13/385 |

FOREIGN PATENT DOCUMENTS

| | | |
|---|---|---|
| EP | 0994419 A2 | 4/2000 |
| EP | 3217270 A1 | 9/2017 |
| EP | 2972625 B1 | 5/2021 |
| JP | 2000-215130 A | 8/2000 |
| JP | 2016517582 A | 6/2016 |

OTHER PUBLICATIONS

"NVM Express Management Interface1.0a," Apr. 8, 2017. (Year: 2017).*

Desai et al., Bladecenter System overview, IBM Journal of Research and Development, Nov. 30, 2005; Armonk vol. 49, Iss. 6; pp. 809-821.

Ruan, X., Intel's Embedded Solutions: from Management to Security, Platform Embedded Security Technology Revealed, Apress, Berkeley, CA, Aug. 9, 2014; pp. 1-35. URL: https://link.springer.com/chapter/10.1007/978-1-4302-6572-6_2/fulltext.html.

An et al., Optimizing the datapath for key-value middleware with nvme ssds over rdma interconnects, Cluster Computing, IEEE, 2017 IEEE International Conference on Date of Conference: Sep. 5-8, 2017, pp. 582-586; URL: http://ieeexplore.ieee.org/document/8048972/.

Prior Art Search Report, CPA Global, CPA Global Reference No. 173830, pp. 1-10.

"NVM Express Management Interface", Apr. 8, 2017. (Year: 2017).

"NVM Express over Fabrics", Jun. 5, 2016. (Year: 2016).

Korean Examination Report dated Aug. 28, 2023, issued in Korean Patent Application No. 10-2018-0154008 (5 pages).

Chinese Office Action dated Oct. 24, 2023, issued in corresponding Chinese Patent Application No. 201811553786.4 (8 pages).

Korean Office Action for KR Application No. 10-2018-0154008 dated Dec. 20, 2023, 2 pages.

* cited by examiner

LOCAL MANAGEMENT CONSOLE FOR STORAGE DEVICES

CROSS-REFERENCE TO RELATED APPLICATION(S)

This application is a continuation application of U.S. patent application Ser. No. 15/894,718, filed Feb. 12, 2018, which claims the benefits of and priority to U.S. Provisional Patent Application Ser. No. 62/608,383 filed Dec. 20, 2017, the disclosures of which are incorporated herein by reference in their entirety.

TECHNICAL FIELD

The present disclosure relates generally to a data storage system including data storage devices, more particularly, to a system and method for providing a local management console for managing data storage devices.

BACKGROUND

Hyperscale computing and new generations of cloud services and networking technologies are redefining data storage and management schemes in a datacenter. As the underlying technologies advance, the existing hardware and infrastructure of the datacenter needs to be reconfigured or scaled, or new infrastructure needs to be built to accommodate the increasing demands for compute, memory, networking, and storage.

Solid-state drives (SSDs) are rapidly becoming main storage elements of modern datacenter infrastructure quickly replacing traditional storage devices such as hard disk drives (HDDs). SSDs offer low latency, high data read/write throughput, and reliable persistent storage of user data. Non-volatile memory express (NVMe) over fabrics (NVMe-oF) is an emerging technology that allows hundreds and thousands of SSDs to be connected over a fabric network such as Ethernet, Fibre Channel, and Infiniband.

The NVMe-oF protocol enables remote direct-attached storage (rDAS) allowing a large number of NVMe SSDs to be connected to a remote host over the established fabric network. The NVMe-oF protocol may use the remote direct memory access (RDMA) to provide a reliable transport service to carry NVMe commands, data, and responses over the network. iWARP, RoCE v1, and RoCE v2 are some examples of the transport protocols that provide an RDMA service. While RDMA has been the primary motivation of enabling NVMe-oF, Fibre Channel over Ethernet (FC-oE) and Transmission Control Protocol (TCP) are/have been also enabled as newer transport protocols for the same purpose.

A traditional storage server includes an x86-based (or similar) central processing unit (CPU) that runs an operating system (OS) to provide interfaces to coupled hardware devices. For example, a server loaded with a standardized operating system (e.g., LINUX) has one or more input ports for providing interfaces to various input devices such as a keyboard and a mouse and a display port to connect a local display device such as a video graphics array (VGA) port, a display port, or a high-definition multimedia interface (HDMI) port. In addition, the server can be connected to a remote display device through a remote session to provide an interface for a service administrator to upkeep the connected hardware devices. For a local user, the interface provides configurability, usability, debug, and status of the locally connected hardware devices.

SSDs compatible with the NVMe-oF standard, eSSDs (Ethernet SSD) in short, can remove the requirement of a costly CPU by fusing networking with storage and supporting a network storage protocol. The protocol translation is handled as much in a hardware-based mechanism such as a field-programmable gate array (FPGA) that provides performance and speed while removing bottlenecks that are inherent in the conventional x86-based CPU-heavy architecture.

A storage rack in a datacenter includes a plurality of enclosures referred to as chassis, and each chassis can include a plurality of storage devices such as eSSDs. Within an eSSD chassis, a low-cost baseboard management controller (BMC) directly manages the connected eSSDs to provide a remote interface to a system administrator to configure, control and report status to a system administrator. Typically, the eSSD chassis does not have a display port for providing a display interface of the eSSDs in a specific eSSD chassis.

SUMMARY

According to one embodiment, a local management console includes: a communication interface to connect to a baseboard management controller (BMC) of a chassis in a data storage rack; and a display that displays information associated with one or more data storage devices in the chassis. The information includes at least one of configuration, control, debugging, or status data associated with at least one of the one or more storage devices. The local management console connects to the BMC through the communication interface, and responsive to receiving a first interaction associated with the display, performs at least one of a configuration, control, debugging, or status acquisition operation on at least one of the one or more data storage devices.

According to another embodiment, a data storage system includes: a host computer including an application; a data storage rack including one or more chassis, wherein each chassis includes an Ethernet switch, a baseboard management controller (BMC), and one or more data storage devices; and one or more local management consoles. each of the local management consoles includes: a communication interface to connect to a baseboard management controller (BMC) of a chassis in a data storage rack; and a display that displays information associated with one or more data storage devices included in the chassis, the information comprising at least one of configuration, control, debugging, or status data associated with at least one of the one or more storage devices. Each of the local management consoles connects to the BMC of each chassis through the communication interface, and responsive to receiving a first interaction associated with the display, performs at least one of a configuration, control, debugging, or status acquisition operation on at least one of the one or more data storage devices.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a local management console for managing data storage devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure a system and method for providing a local management console (LMC) for a chassis that includes a plurality of data storage devices. An example of the data storage device is an NVMe-oF compatible solid-state drive (SSD), herein referred to as an eSSD, and the chassis including plurality of eSSDs is herein also referred to as an Ethernet chassis or an eSSD chassis. The LMC can provide various usages that are currently unavailable with a conventional eSSD chassis.

The LMC can connect to one or more eSSD chassis wiredly and wirelessly. A local administrator may physically carry the LMC in a datacenter, or the LMC may be placed at a strategic location within the datacenter. The LMC can collect data from each of the connected eSSD chassis and act on the data that collected from the eSSD chassis. The local administrator can use the LMC to monitor and query a status, and configure parameters of the eSSDs in the eSSD chassis and can even override, if necessary, and if authorized, any eSSD parameters configured by a remote system administrator (herein also referred to as a super administrator). The LMC can provide a granularity of managing eSSDs in the eSSD chassis, or collectively configuring and managing eSSDs and eSSD chassis using the collected data.

Each eSSD chassis may include a baseboard management controller (BMC). According to one embodiment, the LMC can use an NVMe management interface (NVMe-MI) for communicating with the BMC of each eSSD chassis. The LMC can persist various statistical data including performance related data of the eSSDs over a period of time for offline review and diagnostics for vendor-specific and generic datacenter details. Based on the collected data, the local administrator in possession of the LMC can send instructions to the BMC of the eSSD chassis to perform various configuration and monitoring actions for the eSSD chassis and the eSSDs in the eSSD chassis.

According to one embodiment, the LMC can securely communicate with the BMC. The LMC can not only display the collected data from eSSDs in the eSSD chassis but also securely process and provide statistical data of the eSSDs in the eSSD chassis. The LMC can show data specific to an eSSD chassis and a rack-level or datacenter-level statistical data combining data of multiple eSSD chassis to provide information of a rack, or multiple racks across the datacenter. The remote administrator can offload certain levels of datacenter management tasks to the local administrator through the LMC.

Figure 1:
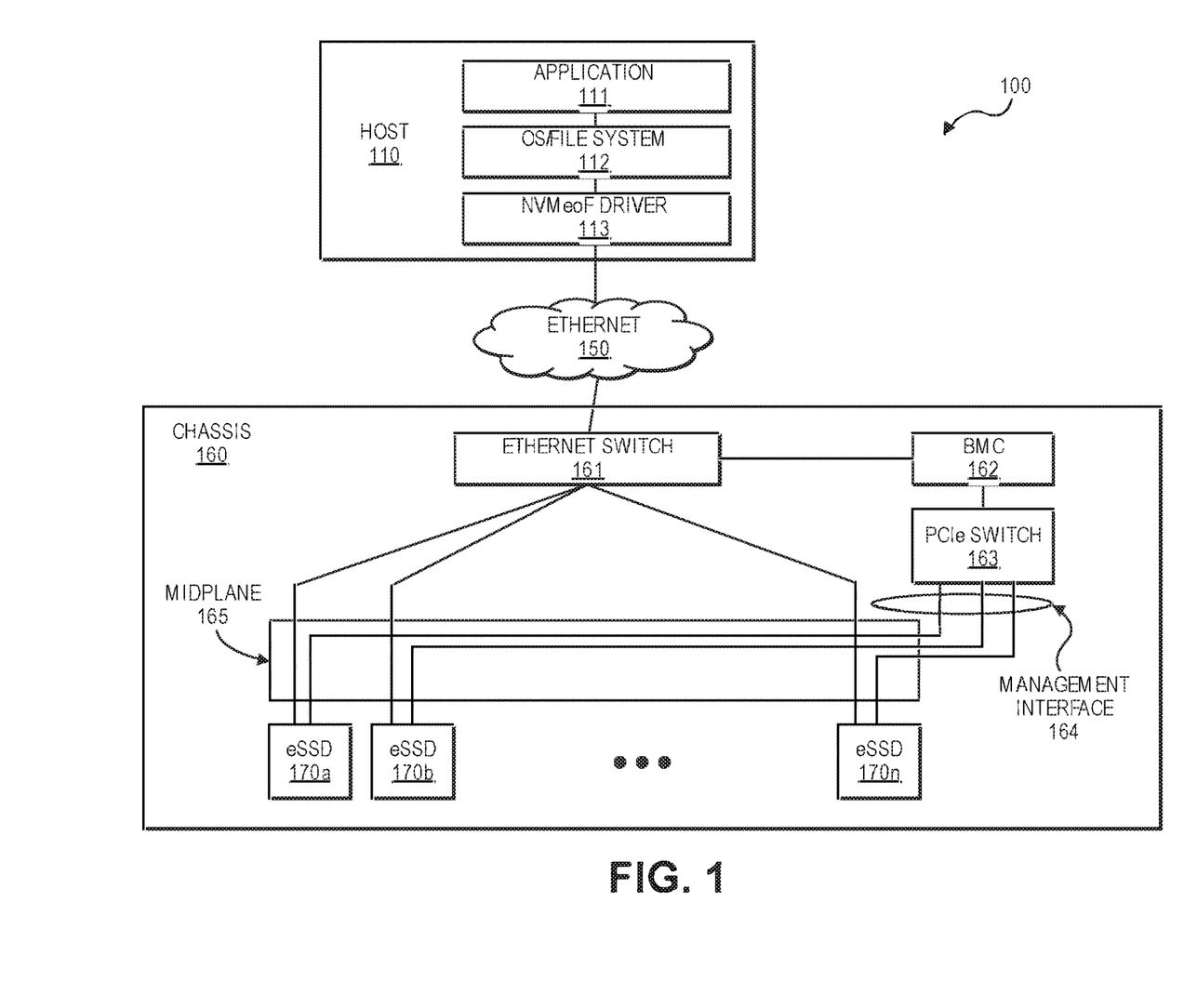
FIG. 1 shows a block diagram of an example data storage system, according to one embodiment.

FIG. 1 shows a block diagram of an example data storage system, according to one embodiment. The data storage system 100 includes a host 110 and a chassis 160 (herein also referred to as an eSSD chassis) containing one or more NVMe-oF-compatible Ethernet SSDs (eSSDs). For example, the chassis 160 includes 24 or 48 eSSDs. The eSSDs in the chassis 160 are respectively denoted as eSSDs 170a-170n (herein collectively referred to as eSSDs 170). The host 110 includes an application 111, an operating system (OS) and a file system (FS) 112, and an NVMe-oF driver 113. An initiator (e.g., the application 111) of the host 110 can establish an NVMe-oF connection with the eSSDs 170 over the Ethernet 150 using the NVMe-oF driver 113. The chassis 160 includes an Ethernet switch 161, a baseboard management controller (BMC) 162, and a peripheral component interconnect express (PCIe) switch 163. The Ethernet switch 161 provides an Ethernet connection to the eSSDs 170 over the midplane 165, and the PCIe switch 163 provides a management interface 164 to the eSSDs 170 over the midplane 165. The BMC 162 can program the eSSDs 170 according to an instruction given by a system administrator.

The Ethernet switch 161 provides network connectivity between the host 110 and the eSSDs 170. The Ethernet switch 161 may have large-capacity (e.g., 100 Gbps) uplinks to connect to one or more hosts. The Ethernet switch 161 also has multiple lower-capacity (e.g., 25 Gbps) downlinks to connect to the eSSDs 170. For example, the Ethernet switch 161 contains 12 uplinks of 100 Gbps and 24 or 48 downlinks of 25 Gbps. The Ethernet switch 161 may have a special configuration/management port to the BMC 162.

The BMC 162 manages the internal components of the chassis 160 including the Ethernet switch 161, the PCIe switch 163, and the eSSDs 170. The BMC 162 can support PCIe and/or system management bus (SMBus) interfaces for the system management. The BMC 162 can configure the eSSDs 170 and program the Ethernet switch 161.

Similar to server based all-flash arrays (AFAs), eSSDs 170 are housed together in a server-less enclosure (i.e., the chassis 160) that contains a bunch of eSSDs, a network switch (i.e., the Ethernet switch 161) to connect them with the outside world's hosts and the BMC 162 to manage them. The BMC 162 handles the boot and control paths to the eSSD devices. Unlike a full-fledged x86 CPU, the BMC 162 may not do all those tasks that a CPU can handle and hence does the minimal enclosure management functions. The BMC 162 does keep a health check on the connected eSSDs 170 and related hardware for connectivity, status, temperature, logs, and errors through the SMBus.

Figure 2:
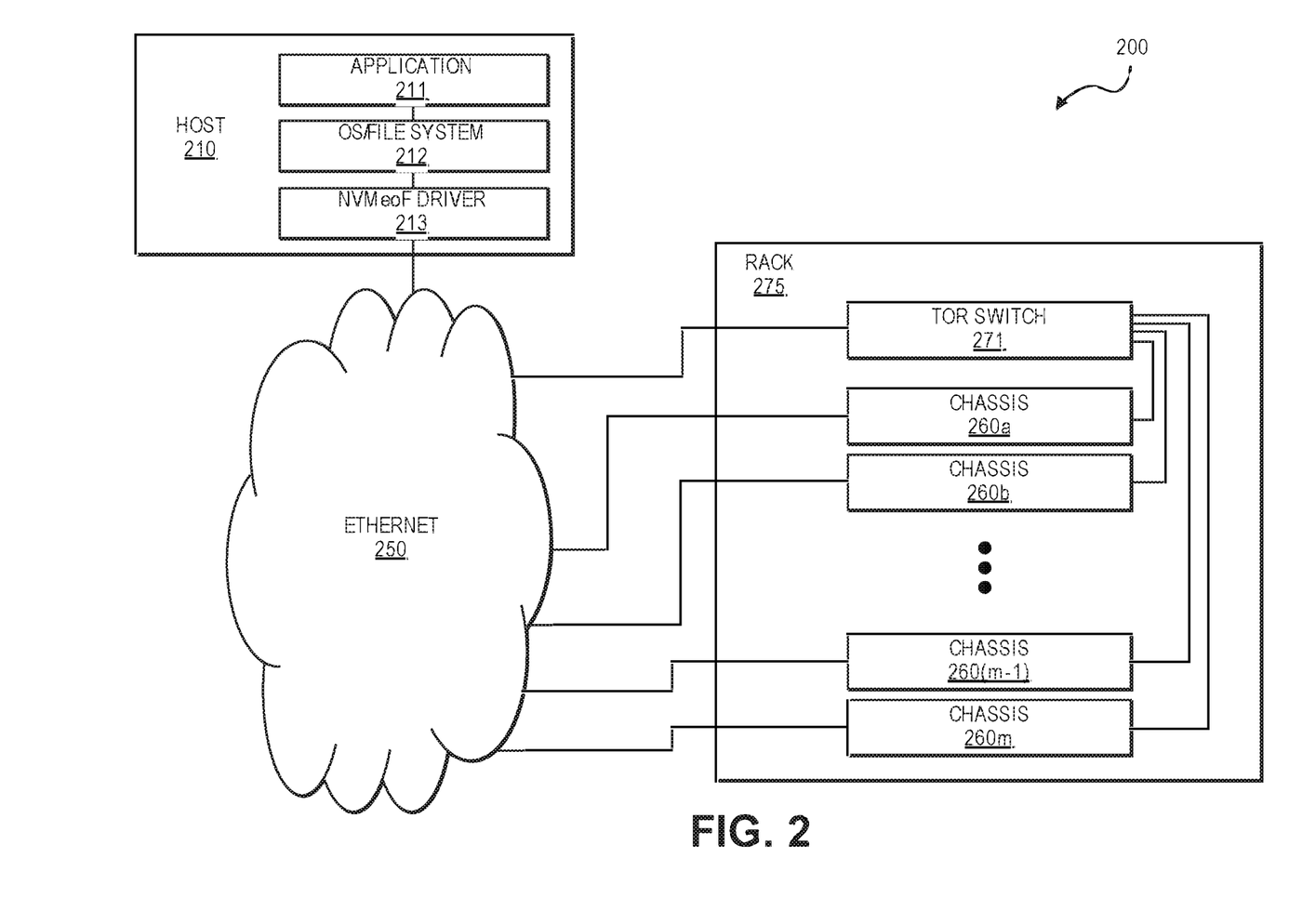
FIG. 2 shows a block diagram of an example data storage system, according to another embodiment.

FIG. 2 shows a block diagram of an example data storage system, according to another embodiment. The data storage system 200 includes a host 210 and a plurality of eSSD chassis 260a-260m (collectively referred to as eSSD chassis 260) that are connected to the host 210 over the Ethernet 250. The host 210 includes an application 211, an operating system (OS) and a file system (FS) 212, and an NVMe-oF driver 213 for connecting with each of the eSSD chassis 260 in a rack 275 over the Ethernet 150. The rack 275 includes a top-of-rack (TOR) switch 271 that provides connectivity among the multiple chassis 260 in the rack 275. Similarly, the NVMe-oF system 200 can include multiple racks 275 that may be located at different locations. The racks 275 can be connected to each other through their TOR switches 271. The TOR switches 271 of the multiple racks 275 may be connected to each other directly via dedicated lines or through external switches over the Ethernet 250.

The CPU-based host 210 runs the operating system and file system 212 to employ host drivers and services to query, control, and apply the services to the eSSDs in the eSSD chassis. The BMC of the eSSD chassis 260 may not have a capability to run the operating system to provide an interface to a local administrator to provide status and other indicators of the eSSDs.

According to one embodiment, the BMC for each eSSD chassis can run a service to provide a remote interface to a local administrator and a super administrator who manage the operation of the datacenter. The service employed by the BMC can be built with minimal elements required to provide a control path to the eSSDs. The BMC may not include an x86 CPU. Instead, the BMC may be an integrated chip including limited memory and logic capable of running embedded applications and firmware code for providing the remote service and other management functions of the chassis.

Although the present examples shown in FIGS. 1 and 2 describe an NVMe-based storage device (i.e., eSSD), but it is noted that the examples described herein may be equally applicable to other types of storage devices. Unlike other types of drives such as Serial AT Attachment (SATA) drives and Serial Attached Small computer system interface (SAS) drives, the eSSD does not have a mechanism to provide a visual indication of the drive status as prescribed by the International Blinking Pattern Interpretation (IBPI) through SFF-8489 specification. Instead, the BMC of the eSSD chassis may provide an interface that can adhere to the SFF-8489 specification. The service employed by the BMC can provide status information using visual indicators on SSD location, failure, rebuild, type, failure modes, and vendor specific usages. The eSSD chassis does not include a CPU (e.g., x86 CPU) and can connected to a local management console (LMC) wiredly or wirelessly. The LMC can provide a graphical user interface to the local administrator. Detailed description of the LMC will be provided below with reference to FIGS. 3, 4A-4D, and 5A-5D.

The present system and method provides an NVMe-oF system including an LMC that provides local management for disaggregated NVMe-oF Ethernet SSD chassis (eSSD chassis or chassis in short) and the eSSDs included therein for local management in conjunction with a remote administrator. The eSSD chassis eSSD chassis provides a large number of SSDs to be connected to remote initiators (e.g., the application 211 of FIG. 2).

The present system and method provides an LMC to configure eSSDs and the chassis for connectivity setup, data protection/reduction and other features, and deployment and removal/replacement of the eSSDs. The LMC can display information at various levels including eSSD, chassis, rack, and datacenter to show serviceability messages, status, performance, etc. Legacy CPU-based servers having a CPU can run an operating system to interact with the datacenter administrator. The present data storage system does not need such CPU-based servers. The LMC can connect with the BMC for each chassis to display data to a local administrator. The LMC can work with a remote administrator to display service messages for the local administrator. The LMC can have a small screen or a grander display depending on a usage and application. The LMC can be connected to the BMC directly or wirelessly. The LMC can digest the BMC-provided data per each chassis to collect and provide chassis-level, rack level, or datacenter-level information.

The present system and method supports a remote direct attached storage (rDAS) model with better latency and IOPs performance. The BMC included in each chassis acts an agent through which the remote administrator can configure and manage the eSSDs in the chassis. The BMC can use the NVMe-MI protocol over the PCIe or SMBus interface to configure, monitor, and manage the eSSDs. The remote administrator may use SwordFish/RedFish or other proprietary communication protocols to communicate with the BMC.

Since the remote administrator is remotely connected, there is a need for local management for the eSSD chassis and other assets available in a storage rack. The LMC provides a mechanism to provide support for the local administrator who may be physically present in the same datacenter in which the storage devices (e.g., eSSDs) physically reside and are managed. A conventional model that allows communication between the BMC to the remote administrator can be expanded to support the communication between the BMC and the local administrator. The local communication between the BMC and the LMC facilitates status updates of the eSSDs to the local administrator. This can also facilitate changes to the eSSDs by the local administrator overriding previously set configurations. The present system and method enables facilitated communication between the BMC and the local administrator using various types of local management consoles, and capability to configure and change attributes and parameters of the eSSDs that are exposed to the local administrator.

The LMC provides a mechanism that can be used by the local administrator to monitor, configure, and manage a NVMe-oF Ethernet SSD chassis and a rack including multiple chassis. In the rDAS model, there can be situations where it may be desirable to have a visibility of a local administrator into the status of the eSSDs. In these situations, it would be desirable to provide configuration capability to the local administrator.

The NVMe-oF Ethernet SSDs, eSSDs in short, provides high performance disaggregated storage of data. The NVMe-oF standard is an emerging technology that allows hundreds and thousands of SSDs to be connected to the remote initiators. Such disaggregated storage needs local storage monitoring and configuration capabilities in addition to traditional administrative functions. The LMC that works with the BMC in the chassis can assist the local administrator. The LMC has a communication link to a BMC, a display unit, and a user input device such as touch screen or keypad.

The local administrator can view various vital stats, current health status, logs, and performance levels of the eSSDs. The local administrator is also capable to effect changes to the configuration of each eSSD through the BMC. An LMC may be able to communicate with other LMCs to form a hierarchy of LMCs or a form a central LMC system for the whole datacenter.

Figure 3:
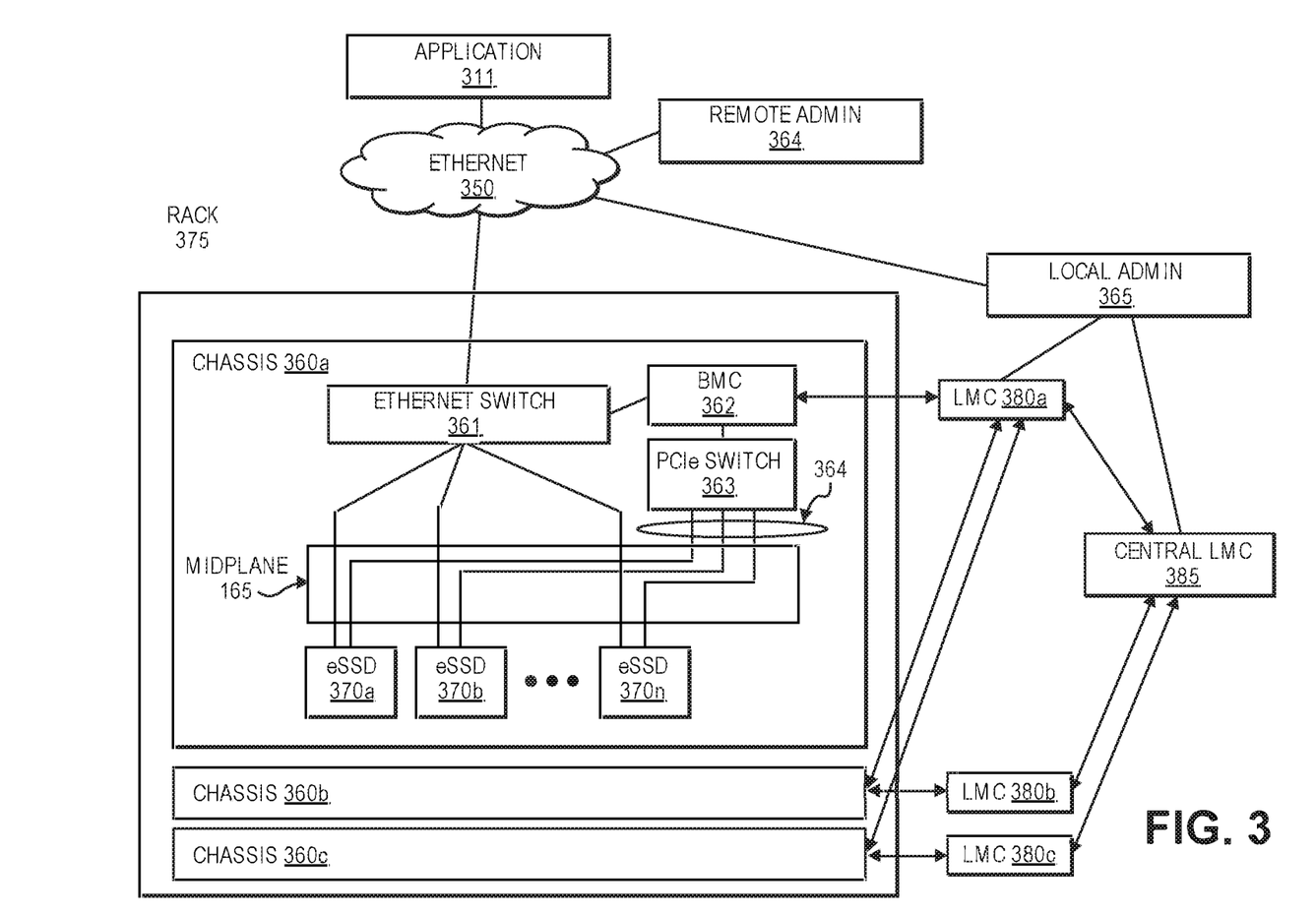
FIG. 3 shows a block diagram of an example data storage system in a datacenter including a local management console (LMC), according to one embodiment.

FIG. 3 shows a block diagram of an example data storage system in a datacenter including a local management console, according to one embodiment. A rack 375 can include one or more chassis 360. Each chassis 360 includes an Ethernet switch 361, a BMC 362, a PCIe switch 363, and a plurality of eSSDs 370a-370n. The Ethernet switch 361 in each chassis 360 connects to an application 311 running on a host computer over the Ethernet 350. The present example shows Ethernet 350 and eSSDs 370; however, it is understood that different type of fabric network other than the Ethernet 350, such as Fibre Channel and Infiniband, and different types of data storage devices other than the eSSDs 370 may be used without deviating from the scope of the present disclosure.

A remote administrator 364 can manage the operation of each chassis 360 via the Ethernet 350. The chassis 360 may not have a display port for connecting to a display device. Instead, the chassis 360 can connect to a local management console (LMC) 380 wiredly or wirelessly. The LMC 380 can provide a communication interface to connect to the chassis 360 and a display for displaying a status of the eSSDs 370 included in the chassis 360. For example, the display of the LMC 380 can display data specific to the chassis 360 and/or eSSDs 370 such as connectivity, input/output (I/O) activity with access requests information such as a size, bytes, I/O counts, distribution, temperature, and detailed information regarding the storage drive and network interface. According to one embodiment, the LMC 380 provides general activities of the eSSDs 370 in the form of a message, for example, an SFF-8489 type message.

According to one embodiment, the LMC 380 can provide an interface to assist an administrator (e.g., a local administrator 365 and a remote administrator 364) in upkeeping of the connected eSSDs 370. For example, the local administrator 365 can use the interface provided by the LMC 380 to configure, control, debug, and display status of the connected eSSDs 370. In one embodiment, the LMC 380 can provide visual indicators to the local administrator 365. The visual indicators may include data, messages, graphics, signs, or the like. For example, the LMC 380 may display a service light to identify a chassis and a rack or other locality-based indicators including, but not limited to, a voice call or a text message.

The LMC 380 may be connected to the chassis 360 in various ways. The BMC 362 of the chassis 360 can drive the connection to the LMC 380 through a directly wired connection such as SMbus, PCIe, and Ethernet or a wireless connection such as wireless local area network (WLAN), Wi-Fi, Bluetooth, Bluetooth Low Energy (BLE) to provide single and status information of the eSSDs 370 within the chassis 360. The LMC 380 can be connected to all chassis within a rack to show a broader rack-level view. The LMC 380 can also be connected to multiple racks within a region of a datacenter or the entire datacenter for a global datacenter-level view.

The LMC 380 may have intelligence to interpret and process the data received from the BMC 362 of the chassis 360. The BMC 362 can merely collect data collected from the eSSDs 370 and send the unprocessed data to the LMC 380.

The communication between the BMC 362 and the LMC 380 is established to be reliable and secure. In one embodiment, the BMC 362 communicates with the eSSDs 370 using the NVMe-MI protocol. The same NVMe-MI protocol can be used for communication between the BMC 362 and the LMC 380. Each LMC 380 can identify itself as a unique device through Identify, Vital Product Data (VPD), and Management data structures as supported in the NVMe-MI protocol to the BMC 362. The VPD utilizes a format defined in the IPMI Platform Management FRU Information Storage Definition. The LMC 380 can advertise its characteristics, features, capabilities, and requirements through the Identify, VPD, and Management data structures. The BMC 362 can periodically poll the LMC 380 to check if the LMC 380 needs to perform any data transfer between the LMC 380 to the BMC 362.

Examples of the data transferred from the LMC 380 to the BMC 362 include, but are not limited to, configuration commands that the LMC 380 performs on the eSSDs 370 or other components in the chassis 360. Examples of the configuration commands that the LMC 380 may set or change through the BMC 362 include, but are not limited to, configuration of a new eSSD or removal of an existing eSSD, updates to existing features for an eSSD, accessibility to an eSSD such as an IP address, an Ethernet address, and switch configuration. The LMC 380 may also instruct the BMC 362 to monitor certain parameters such performance, capacity, or remaining life for certain eSSDs 370. The LMC 380 may provide specific details to the BMC 362 regarding the signals and parameters to monitor, the monitoring frequency, etc.

Examples of the data transferred from the BMC 362 to the LMC 380 include, but are not limited to, various statistical data, status information, logs, or performance data, and the LMC 380 can display the data, generate an email and a text message, or deliver the information to the local administrator 365. The BMC 362 may push such data periodically, or the LMC 380 may pull the data when desired, for example, when the local administrator 365 clicks a button displayed on the LMC 380.

Below is an example pseudo code implemented in a logic of the BMC 362, according to one embodiment. The logic of the BMC 362 includes a data loop through eSSDs in parallel, a data push routine to the LMC 380, and a connection verification routine.

```
Data_loop:
    for eSSD in num(slots):
        'loop through all eSSDs in parallel'
        if monitor(link_state):
            get(link_status)
            push(to_LMC)
        if expired(health_time_filter):
            get(SMART_log)
            push(to_LMC)
        if expired(perf_data_filter):
            get(link_counters)
            push(to_LMC)
to_LMC:
    if count(data_lines) >= collate_threshold
        if connected(LMC)
            push(LMC, data_lines)
Verify_connect:
    if Identity(VPD_packet) in list(eeprom.LMC):
        accept(connect)
```

The communication channel established between the BMC 362 and the LMC 380 and between an LMC 380 and another LMC 380 is a secure channel. To establish the secure communication channel, the BMC 362 may perform an authentication check, and once the secure communication channel is established, the BMC 362 communicates with the LMC 380 for the actual data transfer. The remote administrator 364 may setup permissions and restrictions on the functionalities that are allowed or offloaded to a specific LMC 380. Such synchronization between the remote administrator 364 and the local administrator 365 is critical for the integrity of the storage management. A well-defined and agreed upon set of management policies that the local administrator 365 follows are essential for effective and reliable management of the data storage devices in the datacenter.

According to one embodiment, various parameters of the eSSDs 370 and the chassis 360 including the eSSDs 370 are monitored for local storage management. The LMC 380 can render the monitored status and other statistical data for the use by the local administrator 365. The LMC 380 may send an email or a text message, or provide a snapshot of the collected data to the local administrator 365. Examples of the parameters displayed by the LMC 380 include, but are not limited to, SSD health status, remaining life, alerts, I/O performance, network statistics, logs, vendor-defined parameters. The BMC 362 may process the raw data to generate data regarding the performance data of the eSSDs 370. The LMC 380 may only render or forward the data or the LMC 380 may further process the data that the BMC 362 provided.

According to one embodiment, the present data storage system including one or more LMCs can monitor and display parameters of the data storage devices (e.g., eSSDs) on a desirable granularity. Examples of the granularity are: per eSSD, per chassis, per rack, set of eSSDs across chassis or racks, set of chassis, the whole data center.

According to one embodiment, an LMC 380 can report to another LMC such as a central LMC 385 to broaden the scope of the storage monitoring capability. The LCM 380 and the central LCM 385 may have a different level of permissions and restrictions on functionalities to manage the chassis 360 and the eSSDs 370. Such hierarchy of the LMCs can provide a centralized local storage management scheme by providing a datacenter-level view. The local administrator 365 can zoom in to a finer granularity to see a view-per-rack or view-per-chassis as desired. Although the present example describes a single BMC-to-LMC communication, it is possible that multiple BMCs can communicate to a single LMC over a wireless communication channel.

Figure 4A:
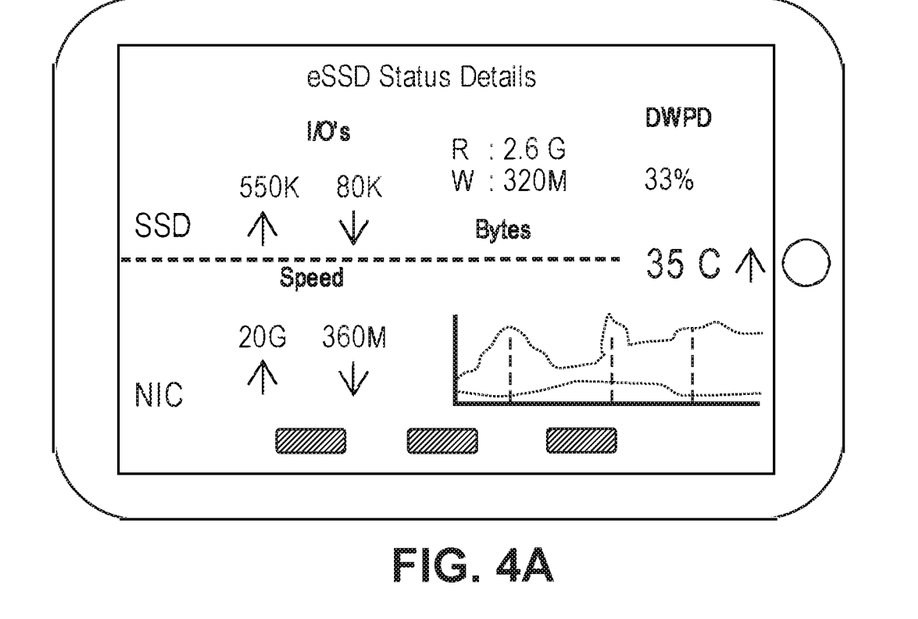
FIGS. 4A through 4D show example display images of an LMC, according to one embodiment.
Figure 4B:
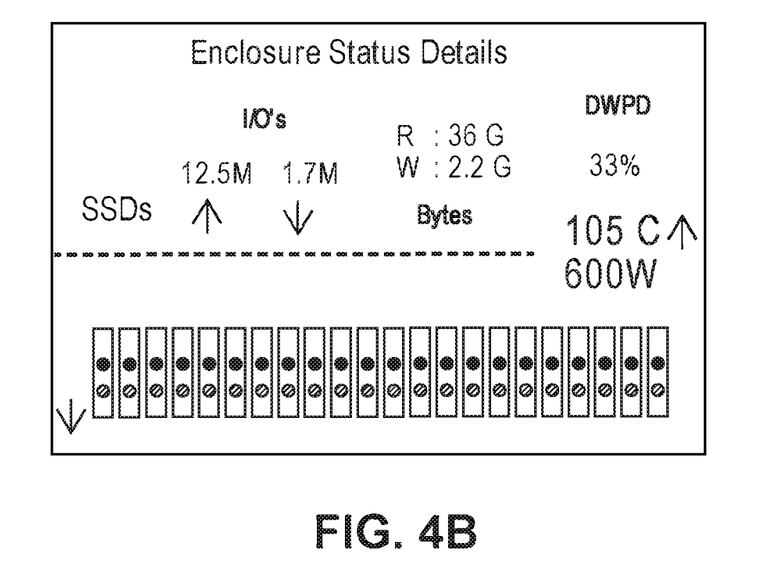
Figure 4C:
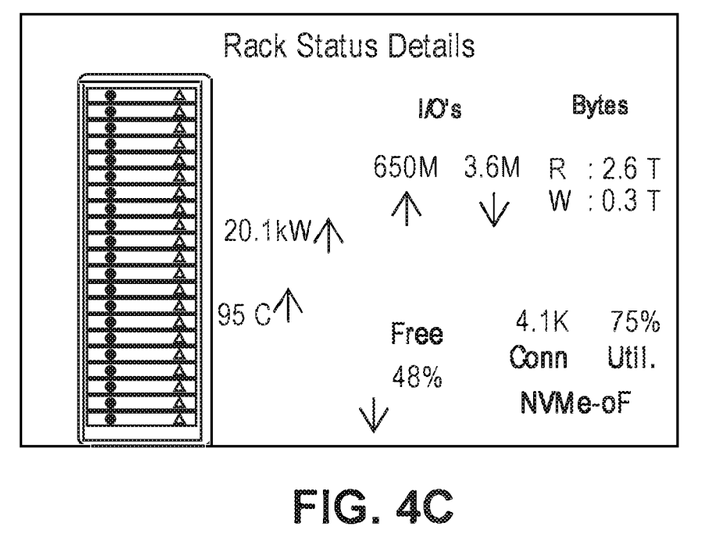
Figure 4D:
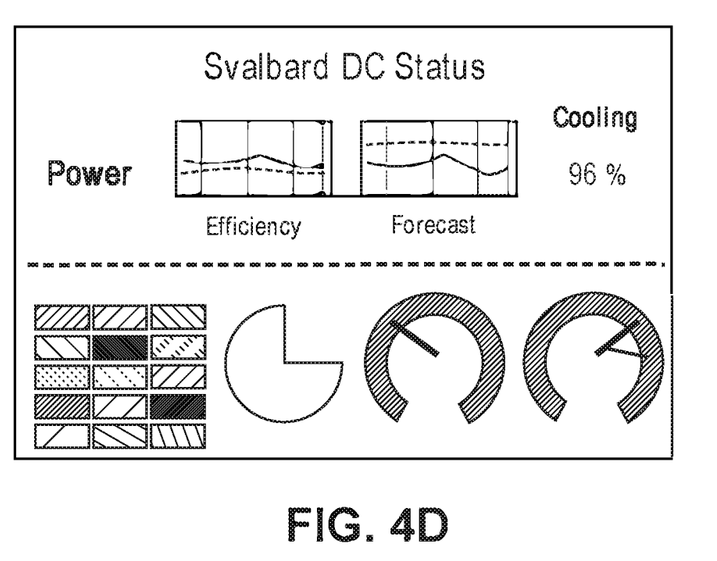

FIGS. 4A through 4D show example display images of an LMC, according to one embodiment. FIG. 4A shows graphs of the eSSD status details including uplink and downlink I/O speeds of a specific eSSD and the Ethernet switch. FIG. 4B shows status (on/off) of the eSSDs included in a specific chassis. FIG. 4C shows status of the chassis included in a specific rack. FIG. 4D shows plots and graphs indicating efficiency and performance forecast at a datacenter level. It is noted that FIGS. 4A through 4D are examples only, and it is understood that many different possibilities may be feasible without deviating from scope or spirit of the present disclosure. The LMC can take a shape of a various form factors. Based on the intended usage, the LMC can be physically attached to the chassis or a rack, or the LMC may be a mobile table that the local administrator can carry in the datacenter.

Figure 5A:
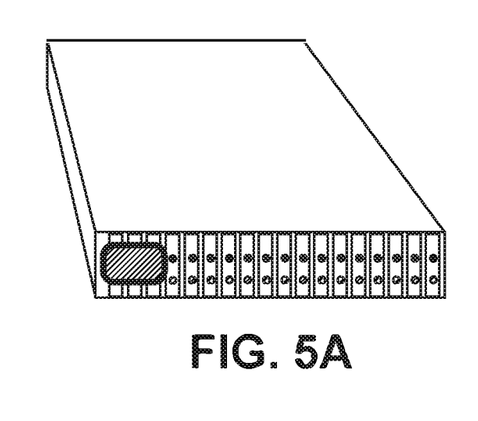
FIGS. 5A through 5D show exemplary configurations of the LMC, according to various embodiments.
Figure 5B:
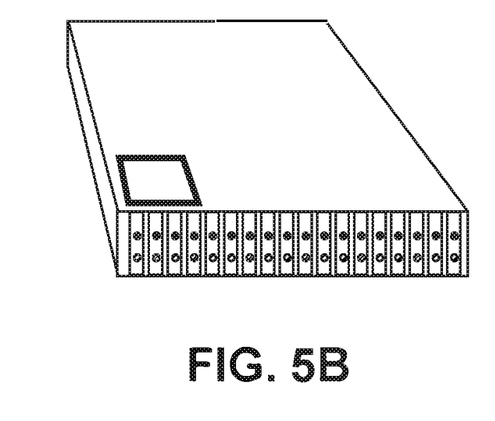
Figure 5C:
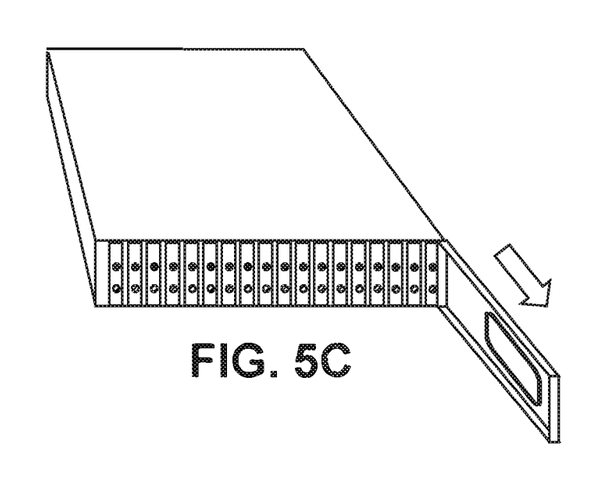
Figure 5D:
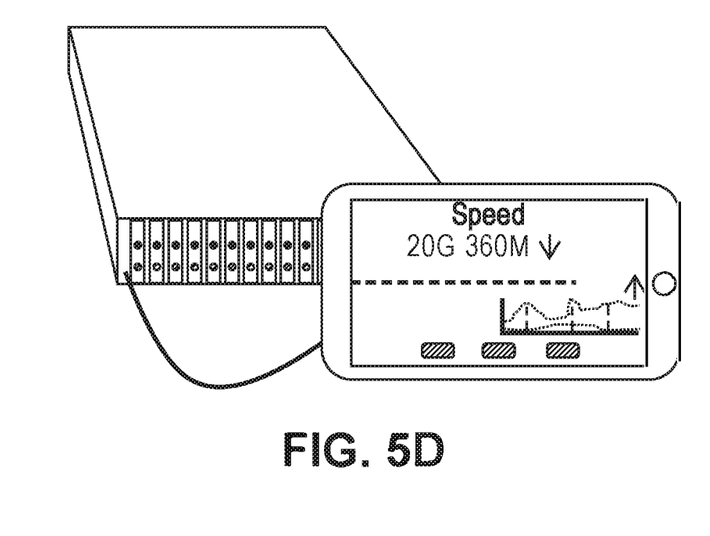

FIGS. 5A through 5D show exemplary configurations of the LMC, according to various embodiments. FIG. 5A shows a type of LMC that can be on a side of the chassis. FIG. 5B shows a type of LMC that can slide on the top of the chassis. FIG. 5C shows a type of LMC that can be inserted into an FRU-U.2 slot. FIG. 5D shows a wireless tablet that can connect to a chassis.

According to one embodiment, a local management console includes: a communication interface to connect to a baseboard management controller (BMC) of a chassis in a data storage rack; and a display that displays information associated with one or more data storage devices in the chassis. The information includes at least one of configuration, control, debugging, or status data associated with at least one of the one or more storage devices. The local management console connects to the BMC through the communication interface, and responsive to receiving a first interaction associated with the display, performs at least one of a configuration, control, debugging, or status acquisition operation on at least one of the one or more data storage devices.

The data storage devices may be nonvolatile memory express (NVMe) over fabrics (NVMe-oF) devices.

The communication interface may be a wired communication interface selected from system management bus (SMbus), a peripheral component interconnect express (PCIe), and Ethernet.

The communication interface may be a wireless communication interface selected from wireless local area network (WLAN), Wi-Fi, Bluetooth, Bluetooth Low Energy (BLE).

The display may show data, a message, a graph, a service light indicating a status of the data storage devices to a local administrator.

A remote administrator may connect to the local administrator and set up permissions and restrictions on functionalities to the local management console.

Data that the local management console sends to the BMC may include configuration commands of the data storage devices.

The configuration commands may include commands for configuring a new data storage device or removal of an existing data storage device, and updating existing features for the data storage devices.

The configuration commands may be commands to configure accessibility to the data storage devices including an IP address, an Ethernet address, and switch configuration of the chassis.

The local management console may send an instruction to the BMC to monitor performance, capacity, or remaining life for the data storage devices.

Data that the BMC sends to the LMC may include statistical data, status, logs, input/output (I/O) performance, health status, remaining life, alerts, network statistics, vendor-defined parameters of the data storage devices and the chassis.

The display may show data of a desirable granularity including data per data storage device, data per chassis, data per rack, data for a set of data storage devices across the chassis or the data storage rack, data for a set of chassis, and data for an entire datacenter.

According to another embodiment, a data storage system includes: a host computer including an application; a data storage rack including one or more chassis, wherein each chassis includes an Ethernet switch, a baseboard management controller (BMC), and one or more data storage devices; and one or more local management consoles. each of the local management consoles includes: a communication interface to connect to a baseboard management controller (BMC) of a chassis in a data storage rack; and a display that displays information associated with one or more data storage devices included in the chassis, the information comprising at least one of configuration, control, debugging, or status data associated with at least one of the one or more storage devices. Each of the local management consoles connects to the BMC of each chassis through the communication interface, and responsive to receiving a first interaction associated with the display, performs at least one of a configuration, control, debugging, or status acquisition operation on at least one of the one or more data storage devices.

The application running on the host computer may access data storage in the data storage devices via Ethernet, and the data storage devices are nonvolatile memory express (NVMe) over fabrics (NVMe-oF) devices.

The display of each of the display management consoles may show data, a message, a graph, a service light indicating a status of the data storage devices to a local administrator.

A remote administrator may connect to the local administrator and set up permissions and restrictions on functionalities to the local management console.

Data that each of the local management consoles sends to the BMC may include configuration commands of the data storage devices.

The configuration commands may include commands for configuring a new data storage device or removal of an existing data storage device, and updating existing features for the data storage devices.

The configuration commands may be commands to configure accessibility to the data storage devices including an IP address, an Ethernet address, and switch configuration of the chassis.

The one or more local management consoles may connect to a central local management console, and wherein the one or more local management consoles and the central local management console may have a different level of permissions and restrictions on functionalities to manage the chassis and the data storage devices.

The above example embodiments have been described hereinabove to illustrate various embodiments of implementing a system and method for providing a local management console for managing data storage devices. Various modifications and departures from the disclosed example embodiments will occur to those having ordinary skill in the art. The subject matter that is intended to be within the scope of the invention is set forth in the following claims.

What is claimed is:

1. An apparatus comprising:
a first interface to communicate with a processing element device in a chassis using a management interface protocol, the chassis comprising the processing element device and a storage device communicatively coupled to the processing element device; and
a second interface to communicate with an administrator, wherein the storage device is accessible over a network using a network address assigned to the storage device, and
wherein the apparatus is configured to:
manage the storage device and perform an operation on the storage device via the first interface and the processing element device,
initiate a presentation of parameters corresponding to the storage device and one or more other storage devices, based on the apparatus being configured to switch from a chassis-level view to a rack-level view, the rack-level view corresponding to a first rack comprising one or more storage-device chassis and a first switch configured to communicatively connect the one or more storage-device chassis of the first rack to a second rack; and
send a signal to a second apparatus to change a scope of the presentation of parameters, the second apparatus having a different level of permissions, from the apparatus, to manage the storage device.

2. The apparatus of claim 1, wherein the storage device is assigned with an Internet Protocol (IP) address that is accessible via Internet, and wherein the network address is assigned to the storage device according to a nonvolatile memory express (NVMe) over fabrics (NVMe-oF) protocol.

3. The apparatus of claim 1, wherein the first interface is a wired communication interface selected from system management bus (SMbus), a peripheral component interconnect express (PCIe), and Ethernet.

4. The apparatus of claim 1, wherein the first interface is a wireless communication interface selected from wireless local area network (WLAN), Wi-Fi, Bluetooth, Bluetooth Low Energy (BLE).

5. The apparatus of claim 1, further comprising a display configured to show at least one of data, a message, a graph, or a service light indicating a status of the storage device to the administrator.

6. The apparatus of claim 1, wherein the administrator sets up permissions and restrictions on functionalities to the apparatus.

7. The apparatus of claim 1, wherein the apparatus sends a configuration command to the processing element device.

8. The apparatus of claim 7, wherein the configuration command configures a new storage device, configures a removal of the storage device, or updates features for the storage device.

9. The apparatus of claim 7, wherein the configuration command configures accessibility to the storage device by configuring an IP address, an Ethernet address, or a switch configuration of the chassis.

10. The apparatus of claim 1, wherein the apparatus sends an instruction to the processing element device to monitor performance, capacity, or remaining life for the storage device.

11. The apparatus of claim 1, wherein data that the processing element device sends to the apparatus, via the first interface, comprises at least one of statistical data, status, logs, input/output (I/O) performance, health status, remaining life, alerts, network statistics, or vendor-defined parameters of the storage device and the chassis.

12. The apparatus of claim 1, wherein the presentation of parameters comprises showing data of a desirable granularity comprising data per storage device, data per chassis, data per rack, data for a set of storage devices across the chassis, data for a set of chassis, and data for a datacenter.

13. A data storage system comprising:
a host computer comprising an application;
a chassis comprising an Ethernet switch, a processing element device, and a storage device communicatively coupled to the processing element device, the Ethernet switch being configured to connect the host computer to the processing element device and the storage device;
an administrator located outside the chassis; and
an apparatus outside of the chassis and communicatively coupled between the processing element device in the chassis and the administrator,
wherein the apparatus comprises:
a first interface to communicate with the processing element device in the chassis, the first interface using a management interface protocol; and
a second interface to communicate with the administrator,
wherein the apparatus is configured to:
initiate a presentation of parameters corresponding to the storage device and one or more other storage devices, based on the apparatus being configured to switch from a chassis-level view to a rack-level view, the rack-level view corresponding to a first rack comprising the chassis and a rack switch configured to communicatively connect the chassis to a second rack;
send a signal to a second apparatus to change a scope of the presentation of parameters, the second apparatus having a different level of permissions, from the apparatus, to manage the storage device; and
manage the storage device and perform an operation on the storage device via the first interface and the processing element device, and
wherein the storage device is accessible over a network using a network address assigned to the storage device.

14. The data storage system of claim 13, wherein a network address is assigned to the storage device according to a nonvolatile memory express (NVMe) over fabrics (NVMe-oF) protocol, and the application running on the host computer accesses a data storage medium in the storage device via Ethernet.

15. The data storage system of claim 13, further comprising a display of the apparatus configured to show at least one of data, a message, a graph, or a service light indicating a status of the storage device to a local administrator.

16. The data storage system of claim 13, wherein the administrator sets up and applies permissions and restrictions on functionalities to the apparatus.

17. The data storage system of claim 13, wherein the apparatus sends a configuration command to the processing element device in the chassis.

18. The data storage system of claim 17, wherein the configuration command configures a new storage device, configures a removal of the storage device, or updates features for the storage device.

19. The data storage system of claim 17, wherein the configuration command configures accessibility to the storage device by configuring an IP address, an Ethernet address, or a switch configuration of the chassis.

20. The data storage system of claim 13, wherein the apparatus communicates with a central apparatus, and wherein the apparatus and the central apparatus have a different level of permissions and restrictions on functionalities to manage the chassis and the storage device.

21. The apparatus of claim 1, wherein the processing element device in the chassis communicates with the storage device using the same protocol used by the apparatus to communicate with the processing element device.

* * * * *